United States Patent [19]

Müller et al.

[11] Patent Number: 6,034,172
[45] Date of Patent: Mar. 7, 2000

[54] EMULSIFIER MIXTURES

[75] Inventors: Felix Müller; Gerd H. Dahms, both of Velbert, Germany

[73] Assignee: Th. Goldschmidt AG, Essen, Germany

[21] Appl. No.: 09/217,309

[22] Filed: Dec. 21, 1998

Related U.S. Application Data

[62] Division of application No. 09/007,208, Jan. 14, 1998, abandoned.

[30] Foreign Application Priority Data

Jan. 16, 1997 [DE] Germany .......................... 197 01 293

[51] Int. Cl.$^7$ ................................ C08L 29/04; C08F 2/16
[52] U.S. Cl. .............................................. 524/803; 524/804
[58] Field of Search ....................................... 524/803, 804

[56] References Cited

FOREIGN PATENT DOCUMENTS 44 08 668  2/1995  Germany .

*Primary Examiner*—Nathan M. Nutter
*Attorney, Agent, or Firm*—Scully, Scott, Murphy & Presser

[57] ABSTRACT

The invention relates to emulsifier mixtures for preparing water-soluble polymers by inverse emulsion polymerization of corresponding monomers or monomer mixtures, to a process for preparing the water-soluble polymers, and to the monomer/water-in-oil emulsions thus obtained. The emulsifier mixture comprises glycerol monooleate and one or more diacetyltartrates of fatty acid glyceride.

6 Claims, No Drawings

EMULSIFIER MIXTURES

CONTINUING DATA

This application is a divisional of U.S. Ser. No. 09/007,208, filed Jan. 14, 1998, and now abandoned.

FIELD OF THE INVENTION

The invention relates to emulsifier mixtures, to their use in a process for preparing water-soluble polymers by inverse emulsion polymerization, and to the monomer/water-in-oil emulsions which can be obtained in this way.

BACKGROUND OF THE INVENTION

During conventional polymerization, a marked viscosity increase of the reaction mixture occurs as a result of the high molecular weight produced during the polymerization, in particular of acrylic acid or acrylamide. A viscosity increase of this type gives problems in achieving thorough mixing and difficulties in removing the heat of reaction. Conventional processes therefore require the use of very complicated polymerization reactors if low conversions and low polymer content are to be avoided.

High-molecular-weight polyacrylic acid or polyacrylamide are therefore currently prepared predominantly in systems of more than one phase, for example by suspension polymerization or emulsion polymerization. The advantages of emulsion/suspension polymerization may be summarized as follows:

1.) The viscosity of the dispersion is independent of the degree of polymerization and therefore the heat of polymerization can be dissipated in a controlled manner.
2.) Relatively easy incorporation of components by feed processes.
3.) There is a high steady concentration of polymer in the growing particles.
4.) Copolymerizations generally proceed in a steady manner to give chemically uniform copolymers.

The inverse emulsion polymerization process, furthermore, permits the preparation of easily handleable water-soluble polymers in emulsion form which can be dissolved much more rapidly than dry polymer powder by inverting the polymer-in-oil emulsion with the addition of water.

High-molecular-weight polymers prepared by inverse emulsion polymerization have gained increasing industrial importance in recent years.

Linear high-molecular-weight polymers made by inverse emulsion polymerization are now used almost exclusively in many applications: in papermaking a cationic acrylamide copolymer (Mw>$10^7$ g/mol) is added to the pulp suspension to bring about microflocculation, which binds the pulp fibers to the fillers and also accelerates the removal of water.

In water treatment, agglomerations of polymer form bridges between a number of suspension particles, creating relatively large flocs which accelerate sedimentation and the filtration of finely divided suspensions of solids. Above a molar mass of about $2 \times 10^6$ g/mol, the rate of sedimentation rises in proportion with the mass of the polymer.

Stabilization of emulsions and dispersions.

An inverse polyacrylic acid or polyacrylamide emulsion is usually prepared in three steps.

1st step: Preparation of a monomer/water-in-oil emulsion
2nd step: Free-radical polymerization of the monomers in the monomer/water droplet, initiated by redox systems and/or free-radical initiators
3rd step: Addition of an inverting surfactant which ensures that the polymer phase is liberated smoothly in the aqueous medium from the W/O system by inversion via a W/O/W system.

Emulsifier mixtures for use in the inverse emulsion polymerization of crosslinked polymers, in particular polyacrylic acids, are known, for example, from U.S. Pat. No. 5,216,070. This document proposes a process for forming water-in-oil emulsions which gives a water-soluble polymer by emulsion polymerization of corresponding monomers in the presence of an initiator and of an emulsifier. The emulsifier used is a polysiloxane-polyalkylene-polyether copolymer. The polymerization of the acid monomer can be carried out with partial or complete neutralization of the monomer and without adverse effects on the stability of the emulsion. Alkoxylated copolymers of this type which are used as emulsifier mixtures, however, frequently cause problems with biodegradable emulsifier systems, in particular based on renewable raw materials.

BRIEF SUMMARY OF THE INVENTION

In a first embodiment of the invention, the above-mentioned problem is solved by means of emulsifier mixtures for preparing water-soluble polymers by inverse emulsion polymerization of corresponding monomers or monomer mixtures, the mixture including glycerol monooleate and one or more diacetyltartrates of fatty acid glyceride.

The present invention provides novel emulsifier mixtures which combine good biodegradability with good emulsifying properties (emulsion stability, promotion of the polymerization reaction).

Another aspect of the invention is processes for carrying out inverse emulsion polymerization using the aforementioned emulsifier mixture.

DETAILED DESCRIPTION OF THE INVENTION

According to the invent on, it is ensured, during the preparation of monomer/water-in-oil emulsions, that only emulsifier mixtures having low autoxidation potential are provided, since the radicals produced from autoxidation can interfere in an uncontrolled manner in the course of the polymerization. Examples of substances which create a particularly high auto-oxidation potential are sorbitan esters of oleic acid and the ethoxylates thereof, since, even during their preparation and storage, these substances can give rise to free radicals at the C═C bond of the oleic acid and at the ether bonds of the sorbitan ring and/or PEG group, and these free radicals can have a marked influence on the course of the free-radical polymerization.

It has been shown here that the hydrophilic autooxidizable ether bond belonging to the sorbitan ring or the PEG group, and extending into the aqueous phase, can cause free radicals to be formed.

Because of the high phase volume ratio between the monomer/water mixture and the oil used, the viscosity of the emulsions and the polymer suspensions produced from them follow the extended Einstein viscosity relationship:

$$\text{Ln } \eta = A\phi C_E + B$$

$\eta$=viscosity of emulsion
$\phi$=phase volume ratio $C_E$=emulsifier concentration A, B=system-specific constants Small changes in the phase volume ratio therefore bring about drastic changes in the viscosity behavior of the emulsion and therefore also in the dissipation of heat from the exothermic polymerization reaction.

Changes in the viscosity of the emulsion moreover affect the uniform distribution and controlled diffusion of the most commonly used initiator AIBN (2,2'-azobisisobutyronitrile).

With high excesses of emulsifier, the viscosity of the aqueous monomer-in-oil emulsion changes and, depending on the micelle size and micelle concentration of the emulsifier used, some of the initiator may also become solubilized.

According to the invention, therefore, it should be ensured during the preparation of the monomer/water-in-oil emulsion, that the droplet size range is as small as possible. The broader the range is as smaller as possible. The broader the range of droplet sizes, the greater the variation, in the concentration, in the droplet, of initiator absorbed via the interface and in the resultant polymerization kinetics of, for example, acrylic acid/acrylamide.

As can be deduced from Stokes' law, the smallest possible droplet size also slows the sedimentation rate of the dispersed polymer droplets and therefore gives increased stability to the emulsion.

$$V = \frac{r^2 \Delta \rho g}{\eta_o} - \frac{2}{9}$$

r=droplet radius $\Delta \rho$=difference in density between oil and aqueous phases g=gravitational acceleration constant $\eta_o$=viscosity of emulsion However, the droplet radius achievable via the monomer/water-in-oil emulsion and the droplet mass resulting therefrom are not nearly small enough to be capable of being held by the oil phase used, whose viscosity is required to be low.

As mentioned above, the viscosity of the emulsion/suspension may be controlled via the phase volume ratio $$\ln \eta \sim \phi$$

The aim was therefore to find the ideal phase volume ratio range, in which it is possible to achieve adequate stability of the emulsions in the shear range of stirring at the prescribed particle size and relatively low viscosity.

This range varies depending on the chemical structure of the emulsifier used the degree of dispersion the polarity of the oil phase used.

The emulsifier mixtures provided according to the invention, therefore, are based on glycerol monooleate and diacetyltartrates of fatty acid glycerides.

Glycerol monooleate is known as a colorless to cream-colored paste which has a melting point of 36° C. and which is insoluble but forms gels in cold or warm water and is soluble with the aid of heat in glycerol, ethanol, fats and hydrocarbons. The products available commercially under these designations are usually mixtures of glycerol monooleate and dioleate with small proportions of palmitin, stearin and linoleic glycerides and triglycerides, free glycerol and free fatty acids. As is known, glycerol monooleate is used for preparing W/O emulsions in the food, cosmetics and pharmaceutical industries. From these sources it is known that this constituent has good biodegradability.

Diacetyltartrates of fatty acid glycerides are another important constituent of the novel emulsifier mixtures. DE 44 08 668 C1 reports that the preparation of these esters is described in DE 20 21 565 C and in AFL, Zeitschrift für Lebensmittel-Technologie und Verfahrenstechnik, 31, 1980, No. 6. Diacetyltartrates of fatty acid glycerides are commercially available under the designation "Datamuls" from Th. Goldschmidt AG, Essen, Germany. The products are waxy (saturated) or pumpable (unsaturated), depending on which glycerides are selected. They are soluble in fats and give emulsion-like systems when taken up in warm water. In the case of the waxy diacetyltartrates, the speed of dissolution, and therefore the activity, increases as the diacetyltartrates are divided more finely. Since, as is known, the diacetyltartrates of fatty acid monoglycerides are used as baking acids, their biodegradability has been tested and vouched for. Although in principle it is also possible, according to the invention, to use pulverulent or waxy diacetyltartrates of fatty acid glycerides, it is particularly preferable, for the purposes of the present invention, to use diacetyltartrates which are liquid at room temperature, since these are easier to incorporate into the polymerization reaction by means of liquid-metering equipment.

For the purposes of the present invention, particular preference is given to diacetyltartrates of the general formulas

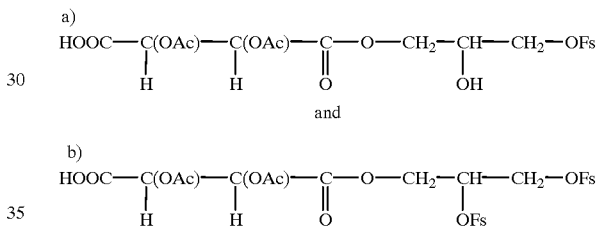

where

Ac is an acetyl group and

Fs is an acyl group of a fatty acid or a fatty acid mixture having from 8 to 18 carbon atoms, where a) and b) are present in a weight of from 100:0 to 60:40.

In a preferred embodiment of the present invention, the emulsifier mixtures are defined in that the fatty acid glyceride base of the diacetyltartrates is derived from soybean oil monoglycerides, since this group has an extremely low autoxidation potential and can therefore particularly preferably be used for preparing water-soluble polymers by inverse emulsion polymerization.

An emulsifier system which has become established in the prior art for the preparation of water-soluble polymers by inverse emulsion polymerization has the trade name "Span 80" (sorbitan monooleate) and/or "Tween 81" (polyethoxylated sorbitan monooleate). For the purposes of the present invention, it is therefore desirable to provide emulsifier mixtures which have properties identical with, or at least similar to, those of the emulsifiers or emulsifier mixtures of the prior art. It is therefore particularly preferable, for the purposes of the present invention, for the weight ratio of glycerol monooleate to diacetyltartrates to be from 10:1 to 1:1, in particular from 5:1 to 3:1.

As is known, the HLB scale makes it possible to classify in particular non-ionic surfactants, and it is known that glycerol monooleate has an HLB value of 3.6. In contrast, the HLB values of the diacetyltartrates of fatty acid glycerides are very high and create extreme difficulties with conventional measurement. The novel emulsifier mixtures, however, should preferably have HLB values corresponding to those of the prior art; see, for example, U.S. Pat. No. 5,216,070. It is therefore particularly preferable according to the invention to provide emulsifier mixtures which have an HLB value of from 4 to 14, in particular from 7 to 12, preferably 10.

Another embodiment of the present invention consists of a process for preparing water-soluble polymers by inverse emulsion polymerization of corresponding monomers or monomer mixtures with the use of the abovementioned emulsifier mixtures.

According to this aspect of the invention, the polymerization is carried out by the following sequence of steps:
 a) providing a monomer/water-in-oil emulsion using an emulsifier,
 b) free-radical polymerization of the monomers in the monomer/water droplets by means of suitable initiator systems and
 c) addition of an inverting surfactant to liberate the polymer phase from the water-in-oil system, wherein the emulsifier is a mixture of glycerol monooleate and one or more diacetyltartrates of fatty acid glycerides.

With the aid of the present invention, it is possible to prepare a large number of water-soluble polymers. These include, for example, polymers or copolymers of acrylic acid, methacrylic acid, itaconic acid, maleic acid and fumaric acid and polyacrylamide including the water-soluble salts of these, in particular alkali metal salts, using crosslinking agents if desired. Aqueous solutions of the monomers mentioned are usually acidic and have a pH in the range of from 2 to 3. For the purposes of the present invention, preference is given to water-soluble salts of polyacrylic acid which are suitable for end-user applications. Particular preference is given, for the purposes of the present invention, to partially neutralized monomers. The partial neutralization of the monomers may be brought about, for example, by adding a conventional base which does not impair the polymerization. Sodium hydroxide and/or potassium hydroxide are particularly preferred.

For preparing easily crosslinked polyacrylates, water-soluble crosslinking agents may be added to the polymerization system. Although a large number of cross-linking agents is known in the prior art, the use of N,N-methylenebisacrylamide is particularly preferred. Other components which may, if desired, be added to the reaction mixture are chelating agents, such as ethylenediaminetetraacetic acid (EDTA).

The easily crosslinked water-in-oil polymer emulsions according to the present invention have high thickening capability in aqueous systems with desirable biological properties. The thickening effect is achieved simply by inversion into the aqueous system. The novel emulsifier mixtures in combination with polymerization initiators known per se convert partially neutralized water-in-oil monomer emulsions into water-in-oil polymer emulsions. The water-in-oil polymer emulsions can be converted simply and effectively into oil-in-water emulsions by diluting with at least an equal part of water, based on volume. The pH of the resultant oil-in-water emulsions is usually from 6 to 7.5, and therefore the products are also suitable for skin care applications. The volume ratio of aqueous phase to oil phase in the emulsions is determined particularly by the stability and ease of handling of the emulsions. It is therefore particularly preferable, for the purposes of the present invention, for the volume ratio of aqueous phase to oil phase in the emulsions to be adjusted to be in the range from 2:1 parts by volume to 4:1 parts by volume, in particular to an oil phase content of from 20 to 24% by volume, preferably 22% by volume. If the oil phase content is adjusted to be too low, this produces a solid emulsion which cannot be processed. In turn, an excessively high oil phase content gives rise to unacceptable costs.

The amount of emulsifier mixtures to be used should be as small as possible. If, however, an excessively small amount of emulsifier mixtures is selected, neither adequate emulsifying action nor, in particular, any stabilizing effect on the emulsions is noted. In turn, however, excessively high concentrations of emulsifier mixtures are unacceptably costly. According to the invention, therefore, it has been found that an amount of from 0.5 to 3% by weight, in particular from 0.5 to 2% by weight, yields particularly good results with respect to stabilizing effect.

The pH of the monomer solution should essentially be adjusted in the weakly acid/neutral to slightly alkaline range. In particular when water-soluble salts are used, a higher saturation concentration results when the pH is slightly alkaline. It is therefore particularly preferably for the purposes of the present invention, for the pH of the monomer/water-in-oil emulsions to be adjusted to be in the range from 6 to 9, in particular from 7 to 8.

Another embodiment of the present invention relates to monomer/water-in-oil emulsions and containing monomers or monomer mixtures of water-soluble polymers, aqueous phase, oil phase, initiator system and emulsifier obtainable by a process as defined above.

The initiator system here may be an initiator system which is used conventionally, such as a tert-butyl hydroperoxide/ascorbic acid redox initiator system or other redox systems based on chlorate, sulfite and hydrogen peroxide/Fe(II)or free-radical initiators, in particular persulfates, hydrogen peroxide, peroxides and azo compounds, such as 2,2'-azobisisobutyronitrile.

With the aid of the present invention, it is possible even if the starting concentration of the emulsifier mixtures is 2% by weight or smaller, to prepare stable emulsions which are superior, in terms of particle size distribution, to conventional emulsions based, for example, on sorbitan monooleate/PEG 4 sorbitan monooleate.

In addition to the high efficiency which results from the low emulsifier concentration, another advantage of the novel emulsifier mixtures is that they do not contain any autooxidizable hydrophilic ether groups. A mixture of this type therefore affects the reaction kinetics of the monomer solution during the polymerization much less than emulsifier mixtures known in the prior art, especially those which have autooxidizable polyether chains which extend into the aqueous monomer phase.

Working Examples

The glycerol monooleates (GMO) used were a commercially available product from Th. Goldschmidt AG, Essen (TEGIN® O). This was mixed in a weight ratio of 4:1 (GMO/ester) with a diacetyltartrate-fatty acid glyceride (a commercially available product from Th. Goldschmidt AG, Essen (Datamuls®43)).

The monomer/water solution consisted of 37% by weight of sodium acrylate in demineralized water. Conductivity at 25° C. was 65 mS/cm and pH was 7.60.

Preparation of the Emulsions

The emulsifying mixture was dissolved in the oil, and the aqueous sodium acrylate solution was added into this solution with vigorous stirring. The resultant W/O emulsion was homogenized for 2 minutes using a high-speed propeller stirrer. The batch size was 200 g in each case.

Dependence of Emulsion Stability on Phase Volume Ratio and Preparation Temperature Monomer/water-in-oil emulsions, like all highly concentrated two-phase W/O emulsions, gain their stability from their viscosity, which can be controlled by means of the phase volume ratio.

To discover the best phase volume ratio for preparing the emulsions, emulsions with varying oil content and sodium acrylate solutions were prepared using the emulsifier mixture (Table 1) and their stability was tested at different storage temperatures (Tables 2 and 3).

TABLE 1

|  | % by weight | % by weight | % by weight | % by weight | % by weight | % by weight |
|---|---|---|---|---|---|---|
| Phase A) | | | | | | |
| Emulsifier mixture | 2.00 | 2.00 | 2.00 | 2.00 | 2.00 | 2.00 |
| Oil phase % | 20.00 | 22.00 | 24.00 | 26.00 | 28.00 | 30.00 |
| Phase B) | | | | | | |
| Sodium acrylate solution | 78.00 | 76.00 | 74.00 | 72.00 | 70.00 | 68.00 |

Preparation: Incorporate phase B into phase A in a commercially available kitchen mixer and homogenize for 2 minutes.

TABLE 2

Stability Test
Preparation temperature 25° C.

| | Oil phase [%] | 20.00 | 22.00 | 24.00 | 26.00 | 28.00 | 30.00 |
|---|---|---|---|---|---|---|---|
| | Storage time | | | | | | |
| 25° C. | 1 day | 1 | 1 | 1 | 1 | 1 | 1 |
| | 3 days | 1 | 1 | 1 | 4/0 (2%) | 4/0 (4.5%) | 4/0 (7.5%) |
| | 1 week | 1 | 1 | 3/0 | 4/0 (3%) | 4/0 (5%) | 4/0 (8%) |
| | 2 weeks | 1 | 1 | 4/0 (3%) | 4/0 (5%) | 4/0 (8%) | 4/0 (11%) |
| 40° C. | 1 day | 1 | 1 | 1 | 1 | 3/0 | 4/0 (3%) |
| | 3 days | 1 | 1 | 4/0 (1%) | 4/0 (3%) | 4/0 (8%) | 4/0 (8%) |
| | 1 week | 1 | 1 | 4/0 (1%) | 4/0 (3%) | 4/0 (8%) | 4/0 (8%) |
| | 2 weeks | 1 | 1 | 4/0 (6%) | 4/0 (8%) | 4/0 (11%) | 4/0 (12%) |

TABLE 3

Preparation temperature 30° C.

| | Oil Phase [%] | 20.00 | 22.00 | 24.00 | 26.00 | 28.00 | 30.00 |
|---|---|---|---|---|---|---|---|
| | Storage time | | | | | | |
| 25° C. | 1 day | 1 | 1 | 1 | 1 | 1 | 1 |
| | 3 days | 1 | 1 | 1 | 3/0 | 4/0 (5%) | 4/0 (5.5%) |
| | 1 week | 1 | 1 | 1 | 4/0 (3%) | 4/0 (5%) | 4/0 (5.5%) |
| | 2 weeks | 1 | 1 | 4/0 (3%) | 4/0 (6%) | 4/0 (8%) | 4/0 (10%) |
| 40° C. | 1 day | 1 | 1 | 1 | 1 | 3/0 | 4/0 (3%) |
| | 3 days | 1 | 1 | 1 | 3/0 | 4/0 (7%) | 4/0 (7.5%) |
| | 1 week | 1 | 1 | 3/0 | 4/0 (5%) | 4/0 (10%) | 4/0 (10%) |
| | 2 weeks | 1 | 1 | 4/0 (5%) | 4/0 (8%) | 4/0 (12%) | 4/0 (13%) |

Result:
1 = satisfactory
2 = inhomogeneous
3/W = visible separation of water
3/0 = visible separation of oil
4/W = measurable separation of water
4/0 = measurable separation of oil
5 = total separation The stability tests showed that
- the best stability is achieved when 22% oil phase is used
- the stability of the emulsions does not depend on the preparation temperature.

Optimization tests relating to emulsifier concentration were also carried out (Table 4). Once again, the emulsification tests were carried out at different temperatures (Tables 5 and 6).

TABLE 4

|  | % by weight | % by weight | % by weight | % by weight |
|---|---|---|---|---|
| Phase A) | | | | |
| Emulsifier mixture | 2.50 | 2.00 | 1.75 | 1.50 |
| Oil Phase % | 20.00 | 22.00 | 24.00 | 26.00 |
| Phase B) | | | | |
| Sodium acrylate solution | 75.50 | 76.00 | 76.25 | 76.50 |

Preparation: Incorporate phase B into Phase A using Esge hand mixer and homogenize for 2 minutes.

TABLE 5

Preparation temperature 25° C.

| | Emulsifier concentration [%] | | 2.50 | 2.00 | 1.75 | 1.50 |
|---|---|---|---|---|---|---|
| | Oil phase [%] | | 22.00 | 22.00 | 22.00 | 22.00 |
| | | Storage time | | | | |
| Room temperature | | 1 day | 1 | 1 | 1 | 1 |
| | | 3 days | 1 | 1 | 1 | 1 |
| | | 1 week | 1 | 1 | 1 | 1 |
| | | 2 weeks | 1 | 1 | 1 | 1 |
| 25° C. | | 1 day | 1 | 1 | 1 | 1 |
| | | 3 days | 1 | 1 | 1 | 1 |
| | | 1 week | 1 | 1 | 1 | 1 |
| | | 2 weeks | 1 | 1 | 1 | 1 |
| 40° C. | | 1 day | 1 | 1 | 1 | 1 |
| | | 3 days | 1 | 1 | 1 | 1 |

TABLE 5-continued

| | Preparation temperature 25° C. | | | |
|---|---|---|---|---|
| Emulsifier concentration [%] | 2.50 | 2.00 | 1.75 | 1.50 |
| 1 week | 1 | 1 | 1 | 1 |
| 2 weeks | 1 | 3/0 | 4/0 (0.5%) | 4/0 (1%) |

TABLE 6

| | | Preparation temperature 30° C. | | | |
|---|---|---|---|---|---|
| Emulsifier concentration [%] | | 2.50 | 2.00 | 1.75 | 1.50 |
| Oil Phase [%] | | 22.00 | 22.00 | 22.00 | 22.00 |
| | Storage time | | | | |
| Room temperature | 1 day | 1 | 1 | 1 | 1 |
| | 3 days | 1 | 1 | 1 | 1 |
| | 1 week | 1 | 1 | 1 | 1 |
| | 2 weeks | 1 | 1 | 1 | 1 |
| 25° C. | 1 day | 1 | 1 | 1 | 1 |
| | 3 days | 1 | 1 | 1 | 1 |
| | 1 week | 1 | 1 | 1 | 1 |
| | 2 weeks | 1 | 1 | 1 | 1 |
| 40° C. | 1 day | 1 | 1 | 1 | 1 |
| | 3 days | 1 | 1 | 1 | 1 |
| | 1 week | 1 | 1 | 1 | 1 |
| | 2 weeks | 1 | 2 | 3/0 | 4/0 (1%) |

Polymerization

A polymerization was also carried out with the aid of the abovementioned constituents. An emulsion was prepared from 76 parts by weight of sodium acrylate solution (37% strength, degree of neutralization 80%), 22 parts by weight of oil phase (Exxsol® D-180-200) and 2 parts by weight of emulsifier mixture comprising 4 parts of glycerol monooleate to 1 part of diacetyltartrates of fatty acid glycerides (Datamuls® 43).

Initiator A was tert-butyl hydroperoxide (10% in water) and B was ascorbic acid (0.5% in water); over a period of four hours, 1.8 g of A and 0.74 g of B were added in 3 portions at room temperature and the monomer was polymerized.

This gave a polymer latex having a viscosity of 1800 mPas (Brookfield; LV-2, 12 rpm) and properties comparable with those of known latices.

What is claimed is:

1. A process for preparing water-soluble polymers by inverse emulsion polymerization of one or more monomers by the following sequence of steps:

a) providing a monomer/water-in-oil emulsion using an emulsifier, b) free-radical polymerizing the monomers in monomer/water droplets by means of an effective initiator system, and c) adding an inverting surfactant to liberate the polymer phase from the water-in-oil system, wherein the emulsifier is a mixture of glycerol monooleate and one or more diacetyltartrates of fatty acid glyceride, wherein the monomers are selected from the group consisting of acrylic acid, methacrylic acid, itaconic acid, maleic acid, fumaric acid, acrylamide, and water-soluble salts of any of the foregoing, and mixtures thereof, wherein the volume ratio of aqueous phase to oil phase in the emulsion is adjusted to be in the range from 2:1 parts by volume to 4:1 parts by volume, the oil phase content of the emulsion is from 20 to 24% by volume, and wherein the emulsifier mixture is used in an amount of from 0.5 to 3% by weight based on the monomer/water-in-oil emulsion.

2. A process as claimed in claim 1, wherein said salts are alkali metal salts.

3. A process as claimed in claim 1, further comprising adding a crosslinking agent to said monomers.

4. A process as claimed in claim 1, wherein the emulsifier mixture is used in an amount of from 0.5 to 2% by weight, based on the monomer/water-in-oil emulsion.

5. A process as claimed in claim 1, wherein the pH of the monomer/water-in-oil emulsion is adjusted to be in the range from 6 to 9.

6. A process as claimed in claim 1, wherein the pH of the monomer/water-in-oil emulsion is adjusted to be in the range from 7 to 8.

* * * * *